US008853949B2

(12) United States Patent
Hamamoto et al.

(10) Patent No.: US 8,853,949 B2
(45) Date of Patent: *Oct. 7, 2014

(54) LED DRIVER WITH END-OF-LIFE DETECTION CIRCUITRY

(75) Inventors: Katsunobu Hamamoto, Osaka (JP); Masafumi Yamamoto, Kyoto (JP); Keisuke Ueda, Osaka (JP); Hisaya Takikita, Osaka (JP)

(73) Assignee: Panasonic Corporation, Osaka (JP)

( * ) Notice: Subject to any disclaimer, the term of this patent is extended or adjusted under 35 U.S.C. 154(b) by 172 days.

This patent is subject to a terminal disclaimer.

(21) Appl. No.: 13/330,987

(22) Filed: Dec. 20, 2011

(65) Prior Publication Data

US 2012/0187847 A1  Jul. 26, 2012

(30) Foreign Application Priority Data

Dec. 20, 2010  (JP) .................................. 2010-283644

(51) Int. Cl.
*H05B 37/02* (2006.01)
*H05B 33/08* (2006.01)

(52) U.S. Cl.
CPC ........... *H05B 33/0815* (2013.01); *Y02B 20/346* (2013.01); *H05B 33/0893* (2013.01)
USPC .......................................... 315/125; 315/297

(58) Field of Classification Search
USPC ............. 315/186, 187, 185 R, 210, 217, 228, 315/244, 250, 297, 307
See application file for complete search history.

(56) References Cited

U.S. PATENT DOCUMENTS 8,310,169 B2 * 11/2012 Yu ................................. 315/246
8,330,388 B2 * 12/2012 Kuo et al. ..................... 315/291
2010/0013393 A1 * 1/2010 Onishi et al. .................. 315/119

FOREIGN PATENT DOCUMENTS

JP  2006210271  8/2006
JP  2009043447  2/2009

* cited by examiner

*Primary Examiner* — Douglas W Owens
*Assistant Examiner* — Monica C King
(74) *Attorney, Agent, or Firm* — Waddey Patterson; Mark J. Patterson; Gary L. Montle

(57) ABSTRACT

An LED lighting device includes a DC/DC power converter having output terminals coupled to respective lamp sockets. A controller receives signals from a current sensor and a voltage sensor, and controls the DC/DC power converter to increase/decrease an output voltage based on a sensed output current with respect to a target value. A sensed output voltage is compared to predetermined upper and lower limit values, and the DC/DC power converter is disabled when the output voltage exceeds the predetermined upper limit value or falls below the predetermined lower limit. The controller further measures an accumulated lighting time of the device, and after the accumulated lighting time has exceeded a predetermined switching time, decreases the upper limit value monotonously or in increments as the accumulated lighting time passes.

20 Claims, 2 Drawing Sheets

LED DRIVER WITH END-OF-LIFE DETECTION CIRCUITRY

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: Japanese Patent Application No. 2010-283644, filed on Dec. 20, 2010.

BACKGROUND OF THE INVENTION

The present invention relates generally to lighting devices that drive a light-emitting source such as an LED (light emitting diode) lamp, and an illumination fixture using the same. More particularly, the present invention relates to an LED lighting device with circuitry for detecting deterioration consistent with an end-of-life condition in an LED lamp, and adjusting a driving output signal accordingly.

In recent years, LEDs have become increasingly popular alternative light sources for illumination with respect to fluorescent lamps. In one conventional example where LED lamps are provided in place of a fluorescent lamp, an LED lamp has a shape close to that of a conventional straight tube type fluorescent lamp. The LED lamp is provided with a light source block that is configured to mount a number of LEDs on a band plate shaped mounting board, a straight tube type glass tube that contains the light source block inside, bases that cover both ends of the glass tube, and terminal pins that are projected from side surfaces of the bases and intended to supply electricity to the light source block. Such an LED lamp is detachably coupled to a lamp socket that is provided in a dedicated illumination fixture, and lights by being supplied with power (DC power) via the lamp socket from an LED lighting device mounted in the illumination fixture.

In another conventional example of such an LED lighting device, control (constant current control) is performed in which a voltage (output voltage) applied to an LED lamp (lamp socket) and a current (output current flowing through the LED lamp) are detected, and the output voltage is adjusted such that the output current becomes equal to a target value (e.g., a rated current of the LED lamp).

However, in the case where a failure such as disconnection or short circuit occurs in the LED lamp, if the LED lighting device keeps supplying power on the basis of the constant current control, the output voltage may increase to an abnormal voltage that exceeds a rated voltage of the LED lamp, or an overcurrent may flow through the LED lamp. For this reason, in the conventional LED lighting device, a control function (lamp abnormality monitoring control) is performed in which an upper limit voltage that is sufficiently higher than the rated voltage of the LED lamp, and a lower limit voltage that is sufficiently lower than the rated voltage of the LED lamp are set. If the output voltage applied to the LED lamp exceeds the upper limit voltage, or falls below the lower limit voltage, the output voltage is reduced or disabled.

That is, if in response to, for example, a deterioration over time a failure such as disconnection or short circuit occurs in the LED lamp, the LED lighting device reduces or disables the output voltage on the basis of the lamp abnormality monitoring control function, and therefore it may be possible to avoid overstressing circuit components that configure the LED lighting device.

Deterioration of an LED lamp is largely influenced by the environment in which it is used (in particular, temperature environment). For example, if an LED lamp that is often used under an environment having higher temperatures than room temperature is compared with an LED lamp that is often used under an environment having lower temperatures than room temperature, it is generally expected that the former LED lamp will deteriorate faster than the latter.

However, in the case where an LED lamp is used over a period of time exceeding a rated life for an illumination fixture (and LED lighting device), if the above-described upper limit value of the output voltage is fixed, a failure (disconnection) of the LED lamp that has accordingly slowly deteriorated may be missed.

BRIEF SUMMARY OF THE INVENTION

In accordance with the present invention, an LED lighting device is provided at least in part for consideration of the above-presented problem. One object of the invention may be to quickly and surely detect a failure of an LED lamp due to deterioration over time.

In an embodiment, an LED lighting device of the present invention is provided with a DC/DC power converter having output terminals coupled to respective lamp sockets. A controller receives signals from a current sensor and a voltage sensor, and controls the DC/DC power converter to increase/decrease the output voltage based on a sensed output current with respect to a target value. A sensed output voltage is compared to predetermined upper and lower limit values. The DC/DC power converter is disabled when the output voltage exceeds the predetermined upper limit value or falls below the predetermined lower limit. The controller further measures an accumulated lighting time of the device, and after the accumulated lighting time has exceeded a predetermined switching time, decreases the upper limit value monotonously or in increments as the accumulated lighting time passes.

In an aspect of the present invention, upon a predetermined reset condition being met, the control circuit of the LED lighting device may reset the accumulated lighting time to zero.

In another aspect of the present invention, after the accumulated lighting time has exceeded a predetermined reset non-operational time subsequent to the switching time, the control circuit of the LED lighting device does not reset the accumulated lighting time even upon the reset condition being met.

In various embodiments, an LED lighting device of the present invention is integrated or otherwise provided with an illumination fixture further including the lamp socket and a fixture main body that holds the LED lighting device and the lamp socket.

In yet another aspect of the present invention, the LED lighting device of the present invention and the illumination fixture including or otherwise utilizing it are effective to quickly and surely detect a failure of an associated LED lamp due to deterioration over time.

DETAILED DESCRIPTION OF THE INVENTION

Figure 1:
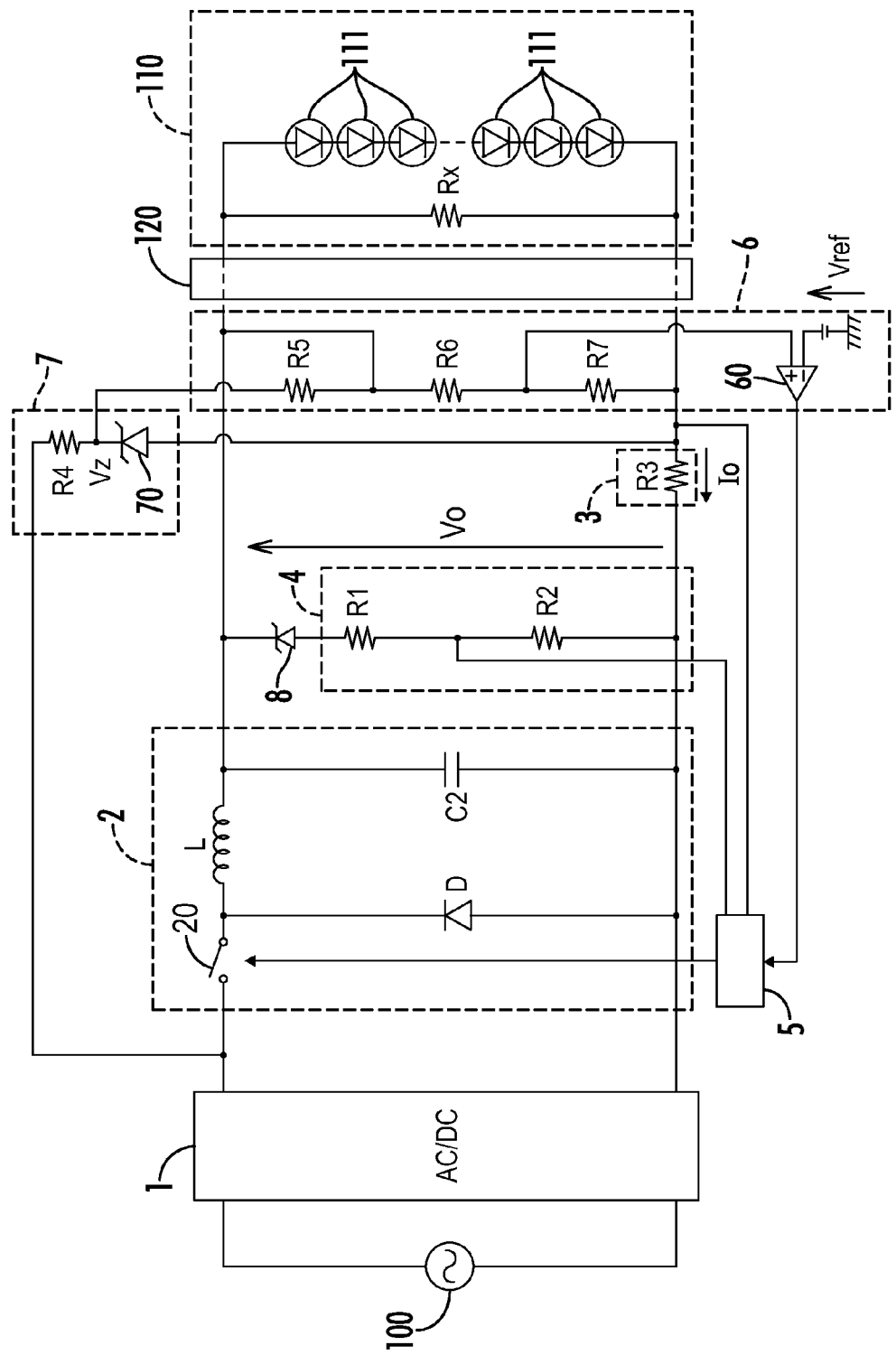
FIG. 1 is a circuit block diagram representing an embodiment of an LED lighting device according to the present invention.
Figure 2:
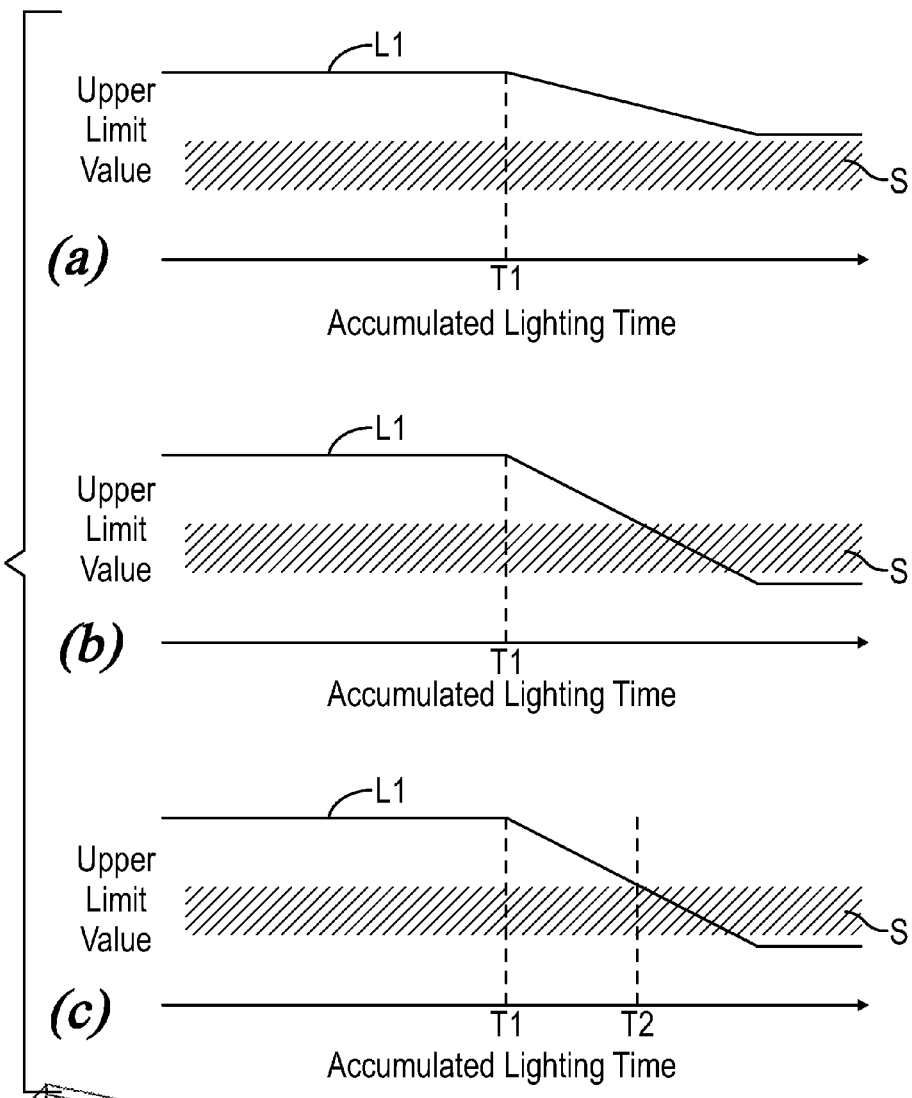
FIGS. 2(a), 2(b) and 2(c) are graphical diagrams representing respective relationships between an accumulated lighting time and an upper limit value of an output voltage in the LED lighting device of FIG. 1.
Figure 3:
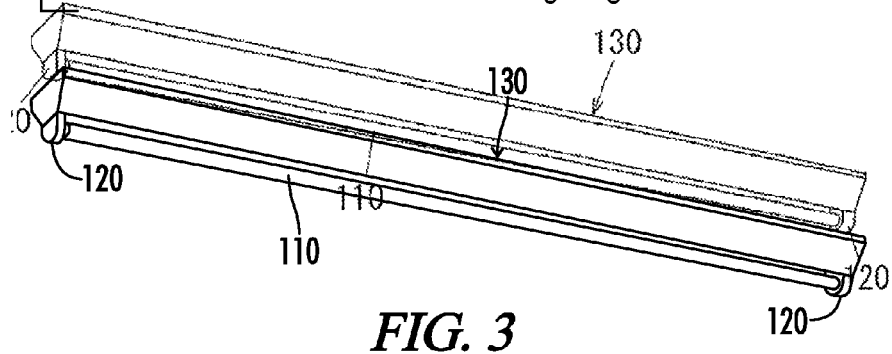
FIG. 3 is a perspective view illustrating an embodiment of an illumination fixture according to the present invention.

Referring generally to FIGS. 1-3, various embodiments of the present invention will hereinafter be described in detail. Where the various figures may describe embodiments sharing various common elements and features with other embodiments, similar elements and features are given the same reference numerals and redundant description thereof may be omitted below.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. The term "circuit" means at least either a single component or a multiplicity of components, either active and/or passive, that are coupled together to provide a desired function. The term "signal" as used herein may include any meanings as may be understood by those of ordinary skill in the art, including at least an electric or magnetic representation of current, voltage, charge, temperature, data or a state of one or more memory locations as expressed on one or more transmission mediums, and generally capable of being transmitted, received, stored, compared, combined or otherwise manipulated in any equivalent manner.

The terms "switching element" and "switch" may be used interchangeably and may refer herein to at least: a variety of transistors as known in the art (including but not limited to FET, BJT, IGBT, JFET, etc.), a switching device, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "power converter" and "converter" unless otherwise defined with respect to a particular element may be used interchangeably herein and with reference to at least DC-DC, DC-AC, AC-DC, buck, buck-boost, boost, half-bridge, full-bridge, H-bridge or various other forms of power conversion or inversion as known to one of skill in the art.

Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The term "controller" or "control circuit" as used herein may refer to at least a general microprocessor, an application specific integrated circuit (ASIC), a digital signal processor (DSP), a microcontroller, a field programmable gate array, or various alternative blocks of discrete circuitry as known in the art, designed to perform functions as further defined herein.

Referring now to FIG. 1, an embodiment of an LED lighting device according to the present invention may be effective to drive (light) an LED lamp 110 which in an exemplary configuration may include a number of light emitting diodes (LEDs) 11 connected in series, a resistor Rx that is coupled in parallel to the series circuit, a straight tube-type glass tube (see FIG. 3), and bases (not illustrated) that effectively cover both ends of the glass tube. Note that, on each of the bases, a pair of projecting terminals may be coupled to one of output terminals of the LED lighting device via a lamp socket 120 Also, a DC current (output current Io) is supplied from the lamp socket 120 to the light emitting diodes 111 via the terminal pins.

An exemplary LED lighting device as represented in FIG. 1 may be provided with an AC/DC converter 1, a DC/DC converter 2, a current sensor 3, a voltage sensor 4, a control circuit 5, a lamp connection determining circuit 6, a constant voltage source 7, and the like. The AC/DC converter 1 may generally be configured to convert an AC voltage supplied from a commercial AC power source 100 to a desired DC voltage, and further to include, for example, a conventionally known step-up chopper circuit (i.e., boost converter as a power factor correction circuit).

An exemplary DC/DC power converter 2 as represented in FIG. 1 may include a conventionally known step-down chopper circuit (buck converter) that is provided with a switching element 20, an inductor L, a diode D, and a capacitor C2.

The voltage sensor 4 may include a series circuit of voltage divider resistors R1 and R2 that are coupled across output terminals of the DC/DC power converter 2 (across both terminals of the capacitor C2) via a zener diode 8. A detection voltage (voltage proportional to an output voltage Vo) resulting from voltage division by the voltage divider resistors R1 and R2 is coupled from the voltage sensor 4 to the control circuit 5. Also, the current sensor 3 includes a resistor R3 that is coupled between the output terminal on a negative side of the DC/DC power converter 2 and a negative terminal side of the lamp socket 12. A voltage drop across the detecting resistor R3 by the output current Io is coupled from the current sensor 3 to the control circuit 5 as the detection voltage.

The control circuit 5 may generally be effective to control the DC/DC power converter 2 to increase/decrease the output voltage Vo so as to make the output current Io as detected by the current sensor 3 equal to a target value. In an embodiment where the control circuit 5 is configured to include a microcontroller and associated memory, data on a rated current value of the LED lamp 110 is preliminarily stored in the memory. Also, the microcontroller (control circuit 5) converts the detection voltage received from the current sensor 3 into a value of the output current Io (current value), and adjusts an on-duty ratio of the switching element 20 to increase/decrease the output voltage Vo so as to make the current value equal to the rated current value (target value) stored in the memory. That is, the control circuit 5 performs constant current control that applies a constant current (rated current) to the LED lamp 110.

A rated voltage of the LED lamp 110 has a value (=Vf×n) resulting from multiplying a forward voltage Vf of the light emitting diodes 111 in use by the number n of the light emitting diodes 111. For example, assuming that the forward voltage Vf is 3.5 volts, and the number n of the light emitting diodes 111 is 20, the rated voltage is 3.5×20=70 volts, and also assuming that the number n of the light emitting diodes 11 is 10, the rated voltage is 3.5×10=35 volts. Further, in to use a plurality of LED lamps having different rated voltages, the control circuit 5 may perform the constant current control at least in a range from 35 V to 70 V.

An exemplary constant voltage source 7 as represented in FIG. 1 may include a resistor R4 having one terminal coupled to a higher potential side output terminal of the AC/DC converter 1, and a zener diode 70 having its cathode coupled to the other terminal of the resistor R4 and its anode coupled to the lower potential side of the lamp socket 120. Also, a constant voltage (zener voltage Vz) generated across the terminals (between the cathode and anode) of the zener diode 70 is coupled to both of the lamp socket 120 and lamp connection determining circuit 6 via a resistor R5.

The constant voltage (zener voltage) coupled from the constant voltage source 7 is required to be a lower voltage than the rated voltage of the LED lamp 110. In the case of a configuration of the LED lighting device that enables a plurality of LED lamps having different rated voltages to be used, an LED lamp having a lower rated voltage may be used as a reference, and the constant voltage (zener voltage) may be set to fall below the rated voltage. Further, where the rated voltage of the LED lamp exceeds an unsafe voltage level and a voltage resulting from voltage division by resistors R5, R6, and R6 exceeds the unsafe voltage, the constant voltage (zener voltage) coupled from the constant voltage source 7 should be a voltage lower than the unsafe voltage level. The value of the unsafe voltage may of course vary depending on jurisdictional or other relevant standards, but in general may be a voltage exceeding 50 VDC.

An exemplary lamp connection determining circuit 6 as represented in FIG. 1 is configured with a series circuit including the three resistors R5, R6, and R7 that are coupled between the cathode of the zener diode 70 and the lower potential side of the lamp socket 120, and a comparator 60 that compares a voltage drop across the resistor (detecting resistor) R7 with a threshold voltage Vref. The connection point (node) between the two resistors R5 and R6 is coupled to a higher potential side of the lamp socket 120. In a state where the lamp socket 120 is not coupled to the LED lamp 110 (unloaded state), the positive terminal of the comparator 60 receives the voltage (voltage drop across the resistor R7) resulting from dividing the zener voltage Vz by the three resistors R5, R6, and R7. On the other hand, in a state where the lamp socket 120 is coupled to the LED lamp 110 (loaded state) the resistance Rx of the LED lamp 110 is coupled in parallel with the two resistors R6 and R7. Therefore, the voltage drop across the resistor R7 in the loaded state is smaller than that in the unloaded state. The threshold voltage Vref input to a negative terminal of the comparator 60 is set to a value between the voltage drops across the resistor R7 in the loaded and unloaded states. Accordingly, the output of the comparator 60 is at an H level in the unloaded state, whereas in the loaded state, it is at an L level. The output of the comparator 60 (i.e., a determination result by the lamp connection determining circuit 6) is coupled to the control circuit 5, and depending on the output of the comparator 60 the control circuit 5 operates or does not operate the DC/DC power converter 2.

An exemplary operation for various embodiments of the LED lighting device of the present embodiment may now be described. First, when a power switch (not shown) is turned on to start supplying power from the commercial AC power source 100, the AC/DC converter 1 operates to provide a DC voltage. When the DC voltage is provided from the AC/DC converter 1, the constant voltage (zener voltage Vz) is applied to the lamp connection determining circuit 6 and the lamp socket 120 from the constant voltage source 7.

If the zener diode 8 is not present, while the DC/DC power converter 2 is disabled, the series circuit of the two resistors R6 and R7 of the lamp connection determining circuit 6 and the series circuit of the two voltage divider resistors R1 and R2 of the voltage sensor 4 will be coupled across output terminals of the AC/DC converter 1. If so, in the process where the output voltage of the AC/DC converter 1 gradually increases after activation, the time necessary for a voltage at the node between the resistors R4 and R5 to exceed the zener voltage Vz of the zener diode 70 (a time necessary to stabilize an output voltage of the constant voltage source 7) becomes relatively longer. However, in the configuration of the LED lighting device in an embodiment as shown in FIG. 1, the zener diode 8 having a higher zener voltage than that of the zener diode 70 of the constant voltage source 7 is coupled between the voltage sensor 4 and the positive potential (higher potential) side output terminal of the DC/DC power converter 2. For this reason, in the process where the output voltage of the AC/DC converter 1 increases, before the voltage at the node between the resistors R5 and R6 exceeds the zener voltage of the zener diode 8, the voltage sensor 4 is separated from the lamp connection determining circuit 6 and the constant current source 7. That is, as compared with the case where the zener diode 8 is not present, the time necessary to stabilize the output voltage of the constant voltage source 7 can be shortened.

With the output voltage of the constant voltage source 7 stabilized, the lamp connection determining circuit 6 may determine whether a lamp connection state for the device is the loaded or the unloaded state. If a result of the determination by the lamp connection determining circuit 6 corresponds to the loaded state, the control circuit 5 operates the DC/DC power converter 2 to start the constant current control. On the other hand, if the result of the determination by the lamp connection determining circuit 6 corresponds to the unloaded state, the control circuit 5 disables or otherwise does not operate the DC/DC power converter 2.

If, in the unloaded state, a voltage equal to or more than the rated voltage of the LED lamp 110 were to be output from the DC/DC power converter 2, an overcurrent exceeding the rated value of the device might flow immediately after the LED lamp 110 is connected to the lamp socket 120. However, in accordance with an embodiment of the present invention, before the lamp connection determining circuit 5 determines the presence or absence of the connection of the LED lamp 110, the control circuit 5 of the LED lighting device disables the operation of the DC/DC power converter 2. Then, after the lamp connection determining circuit 6 has determined that the connection is present (loaded state), the control circuit 5 enables/starts the operation of the DC/DC power converter 2, and accordingly the voltage equal to or greater than the rated voltage is not applied to the LED lamp 110. As a result, a current that flows when the LED lamp 110 is attached to the lamp socket 120 is suppressed, and therefore a failure of the LED lamp 110 can be prevented.

Subsequently, the case where a failure occurs in the LED lamp 110 during operation of the DC/DC power converter 2 is described. For example, if the LED lamp 110 is disconnected, the flow of the output current Io stops; however, the control circuit 5 keeps performing constant current control, and therefore the output voltage Vo of the DC/DC power converter 2 increases. If the output voltage Vo detected by the voltage sensor 4 exceeds a predetermined upper limit value (>rated voltage), the control circuit 5 stops performing constant current control to disable the DC/DC power converter 2.

If the LED lamp 110 is short-circuited, the number of LEDs 111 is substantially decreased, so that the control circuit 5 performs constant current control to thereby reduce the output voltage Vo of the DC/DC power converter 2. Then, if the output voltage detected by the voltage sensor 4 falls below a predetermined value (<rated voltage), the control circuit 5 stops performing constant current control to stop the DC/DC power converter 2.

As described above, if a failure such as disconnection or short circuit occurs in the LED lamp 110, the control circuit 5 disables operation of the DC/DC power converter 2, and therefore the failed LED lamp 110 can be effectively prevented from causing further damage. In various embodiments, at the time of an unloaded state or failure, the control circuit 5 may not necessarily stop the DC/DC power converter 2 to achieve the same object. For example, at the time of an unloaded state or failure, the control circuit 5 may control the DC/DC power converter 2 to limit the output voltage Vo to a value that is sufficiently lower than the rated voltage of the LED lamp 110 and equal to or less than the lower limit value. Also, while the LED lighting device of the present embodiment lights the one LED lamp 110 shown, it should be appreciated that the LED lighting device can also light a plurality of series connected LED lamps 110 at the same time. Further, the present invention may be configured such that, after the power supply from the commercial AC power source 100 has been started, first, the lamp connection determining circuit 6 determines whether the connecting state is the loaded or unloaded state, and if a result of the determination corresponds to the loaded state, the control circuit 5 operates the AC/DC converter 1 and the DC/DC power converter 2.

The control circuit 5 measures an accumulated lighting time of the LED lamp 110 with a built-in timer in the microcontroller. As indicated by a solid line L1 in FIG. 2(a), after the accumulated lighting time (horizontal axis) has exceeded a predetermined switching time T1, as the accumulated lighting time passes, the control circuit 5 steadily decreases the upper limit value. The hatched regions S in FIGS. 2(a)-(c) represent a range within which the rated voltage of the LED lamp 110 (accounting for individual differences) may fall. In addition, the switching time T1 is preferably set to a time comparable to a rated life of the LED lamp (life defined by light flux attenuation, or rated life of circuit components configuring the LED lamp), or a rated life of the LED lighting device (rated life of circuit components configuring the LED lighting device).

Thus, after the accumulated lighting time of the LED lamp 110 has exceeded the switching time T1, the upper limit value that is compared with the output voltage detected by the voltage sensor 4 is steadily decreased as time passes, so that even in the case where the LED lamp 110 has been used for a period of time as long as exceeding a rated life of an illumination fixture (LED lighting device), a failure of the LED lamp 110 due to deterioration over time can be quickly and surely detected. Note that the control circuit 5 does not necessarily linearly decrease the upper limit value, but may for example decrease it in an incremented (e.g., stepwise) manner or other non-linear decreases such as an exponential slope.

In an exemplary embodiment as represented by the solid line L1 in FIG. 2(a), the control circuit 5 does not decrease the upper limit value to the rated voltage (area S) of the LED lamp 110 or less. However, in some cases as indicated by a solid line L1 in FIG. 2(b), it may decrease the upper limit value to the rated voltage (area S) of the LED lamp 110 or less.

In various embodiments of the present invention, when a predetermined reset condition is met, the control circuit 5 resets the accumulated lighting time to zero. The reset condition may be, for example, where, after the output voltage has exceeded the upper limit value to disable the DC/DC power converter 2, the DC/DC power converter 2 again starts operating, and the connection determining circuit 6 determines that the LED lamp 110 has been replaced (i.e., the connection state is the loaded state after a previous determination of the unloaded state). However, in the case where the control circuit 5 decreases the upper limit value to the rated voltage (area S) of the LED lamp 110 or less, as illustrated in FIG. 2(c), after the accumulated lighting time has passed a point in time (reset non-operational time) T2 where the solid line L1 of the upper limit value intersects with the area S, even in the case where the reset condition is met it is preferable not to reset the accumulated lighting time. That is, in the case where the LED lighting device has been used for a period of time as long as passing the reset non-operational time T2, if it continues to be used various problems are likely to occur. For this reason, if when the LED lamp 110 is replaced, the control circuit 5 does not reset the accumulated lighting time, the LED lamp 110 does not light and therefore a user can be at least implicitly prompted to replace the LED lighting device (illumination fixture). Also, as the accumulated lighting time passes, the upper limit value is steadily decreased, so that due to a variation in deterioration over time of the LED lamp 110, the time for the LED lamp 110 to stop lighting also has a variation. Therefore, even in a general office where a plurality of illumination fixtures are used, LED lamps 110 can be substantially prevented from experiencing a general lighting failure all at once.

The LED lighting device of the present invention may be mounted in an illumination fixture, an example of which is illustrated in FIG. 3. The exemplary illumination fixture is provided with a fixture main body (housing) 130 which may be directly attached to a ceiling, and a pair of lamp sockets 120 and 120 provided for the fixture main body 130.

The fixture main body 130 is formed in an elongated angular tube shape of which a side shape as viewed from a longer direction is trapezoidal, and inside which the LED lighting device is contained. Also, at either end of a lower surface of the fixture main body 130, the lamp sockets 120 are respectively positioned. Each of the lamp sockets 120 may typically have the same structure as that of a lamp socket for a conventionally well-known straight tube type fluorescent lamp.

In the case where a DC current is supplied from any one of the two lamp sockets 120 to the LED lamp 110, even if a fluorescent lamp is erroneously fit into the lamp sockets 120, the DC current may be supplied to a filament part. However, as described above, when the output voltage detected by the voltage sensor 4 falls below the predetermined value (<rated voltage), the DC/DC power converter 2 is disabled, and therefore even in the case where the fluorescent lamp is erroneously fit, an unstable phenomenon or failure of the lighting device is substantially prevented from occurring.

However, a user cannot distinguish whether the mis-fitting of the fluorescent lamp is safe or unsafe. Therefore, the electrode shape of the bases of the LED lamp 110 may be made to have a different shape from that of the fluorescent lamp to prevent the mis-fitting, and the lamp sockets 120 and 120 may have a structure that corresponds to that of the bases of the LED lamp 110.

Also, the above-described switching time T1 may be, in the case where resin materials (or an equivalent) are used for the lamp socket, the LED lamp base, and the like configuring the illumination fixture, set to a time compatible to a use time within which there is no (or a substantially reduced) possibility of deteriorating the resin materials for the lamp sockets and the LED lamp 110 to give rise to an unstable phenomenon.

The previous detailed description has been provided for the purposes of illustration and description. Thus, although there have been described particular embodiments of the present invention of a new and useful "LED Driver with End-of-Life Detection Circuitry," it is not intended that such references be construed as limitations upon the scope of this invention except as set forth in the following claims.

What is claimed is:

1. An LED lighting device comprising:
a DC/DC power converter having first and second converter output terminals and effective to supply an output voltage across the converter output terminals;
first and second lighting device output terminals coupled to the first and second converter output terminals, respectively, and effective to receive an LED lamp;
a current sensor coupled between one of the converter output terminals and a corresponding device output terminal, and effective to detect an output current;
a voltage sensor coupled across the converter output terminals and effective to detect the output voltage; and
a control circuit which
controls the DC/DC power converter to adjust the output voltage based on the output current detected by the current sensor with respect to a target value,
compares the output voltage detected by the voltage sensor to a predetermined upper limit value, and upon the output voltage exceeding the predetermined upper limit value, disables the DC/DC power converter,
measures an accumulated lighting time of the device, and after the accumulated lighting time has exceeded a predetermined switching time, decreases the upper limit value as the accumulated lighting time passes, and
identifies when the accumulated lighting time has exceeded a predetermined reset disabling time subsequent to the predetermined switching time, wherein the control circuit does not reset the accumulated lighting time even upon the reset condition being met.

2. The LED lighting device of claim 1, the control circuit further identifies a predetermined reset condition being met, and upon identifying the predetermined reset condition as having been met, resets the accumulated lighting time to zero.

3. The LED lighting device of claim 1, wherein the predetermined reset disabling time corresponds to a point at which the upper limit value is equal to or below a rated voltage.

4. The LED lighting device of claim 1, the control circuit decreases the upper limit value linearly over time after the accumulated lighting time has exceeded a predetermined switching time.

5. The LED lighting device of claim 1, the control circuit decreases the upper limit value in stepped increments over time after the accumulated lighting time has exceeded a predetermined switching time.

6. The LED lighting device of claim 1, the control circuit decreases the upper limit value exponentially over time after the accumulated lighting time has exceeded a predetermined switching time.

7. The LED lighting device of claim 1, further comprising
an AC/DC power converter coupled to first and second input terminals of the DC/DC power converter;
a constant voltage source coupled to a node between the AC/DC converter and the first input terminal of the DC/DC converter and which provides a constant output voltage less than a rated voltage across the device output terminals; and
a lamp connection determining circuit which generates an output signal representative of a loaded state or an unloaded state for the first and second device output terminals,
the control circuit further enables the DC/DC converter upon receiving an output signal representative of a loaded state.

8. The LED lighting device of claim 7, the control circuit further during a loaded state
compares the detected output voltage from the voltage sensor to the predetermined upper limit and a predetermined lower limit,
enables the DC/DC converter when the detected output voltage is between the predetermined upper and lower limits,
disables the DC/DC converter when the detected output voltage is greater than the predetermined upper limit or less than the predetermined lower limit, and
disables the DC/DC converter upon receiving an output signal representative of an unloaded state.

9. The LED lighting device of claim 8, further comprising a zener diode coupled between the voltage sensor and a positive output terminal, the zener diode having a breakdown voltage greater than the constant voltage output from the constant voltage source.

10. The LED lighting device of claim 7, the control circuit further during a loaded state
compares the detected output voltage from the voltage sensor to the predetermined upper limit and a predetermined lower limit,
enables the DC/DC converter when the detected output voltage is between the predetermined upper and lower limits, and
disables the DC/DC converter when the detected output voltage is greater than the predetermined upper limit or less than the predetermined lower limit, and
controls the DC/DC converter to decrease the output voltage to less than the predetermined lower limit upon receiving an output signal representative of an unloaded state.

11. The LED lighting device of claim 10, further comprising a zener diode coupled between the voltage sensor and a positive output terminal, the zener diode comprising a breakdown voltage greater than the constant voltage output from the constant voltage source.

12. A method of operating an LED lighting device that includes a DC/DC power converter which supplies an output voltage to an LED lamp, the method comprising:
sensing the output voltage and comparing the output voltage to both of a predetermined upper limit value and a predetermined lower limit value;
upon the output voltage exceeding the predetermined upper limit value, disabling the DC/DC power converter;
sensing an output current and comparing the output current to a target value;
controlling the DC/DC power converter to increase/decrease the output voltage when the output current is less than/greater than the target value, respectively;
measuring an accumulated lighting time of the device with respect to an LED lamp;
after the accumulated lighting time has exceeded a predetermined switching time, decreasing the upper limit value as the accumulated lighting time passes, and
identifying when the accumulated lighting time has exceeded a predetermined reset disabling time subsequent to the predetermined switching time, wherein the control circuit does not reset the accumulated lighting time even upon the reset condition being met.

13. The method of claim 12, further comprising the steps of:
identifying a predetermined reset condition being met, and
upon identifying the predetermined reset condition as having been met, resetting the accumulated lighting time to zero.

14. The method of claim 12, wherein the predetermined reset disabling time corresponds to a point at which the upper limit value is equal to or below a rated voltage.

15. The method of claim 12, the LED lighting device further including a constant voltage source, the method further comprising the steps of:
upon initially receiving mains input power to the LED lighting device, while the DC/DC converter is disabled, providing a constant output voltage less than a rated voltage from the constant voltage source;
determining a lamp connection state comprising a loaded state or an unloaded state with respect to the LED lighting device; and
upon determining a loaded state, enabling the DC/DC converter.

16. The method of claim 15, further comprising the steps of:
comparing the output voltage to the predetermined upper limit and a predetermined lower limit;
in a loaded state, disabling the DC/DC converter when the detected output voltage is greater than the predetermined upper limit or less than the predetermined lower limit; and
upon determining an unloaded state, disabling the DC/DC converter.

17. A method of operating an LED lighting device that includes a DC/DC power converter effective to supply an output voltage to an LED lamp, the method comprising:
sensing the output voltage and comparing the output voltage to both of a predetermined upper limit value and a predetermined lower limit value;
upon the output voltage exceeding the predetermined upper limit value, disabling the DC/DC power converter;
sensing an output current and comparing the output current to a target value;
controlling the DC/DC power converter to increase/decrease the output voltage when the output current is less than/greater than the target value, respectively;
measuring an accumulated lighting time of the device with respect to an LED lamp;
after the accumulated lighting time has exceeded a predetermined switching time, decreasing the upper limit value as the accumulated lighting time passes;
upon initially receiving mains input power to the LED lighting device, while the DC/DC converter is disabled, providing a constant output voltage less than a rated voltage from the constant voltage source;
determining a lamp connection state comprising a loaded state or an unloaded state with respect to the LED lighting device; and
upon determining a loaded state, enabling the DC/DC converter.

18. The method of claim 17, further comprising the steps of:
comparing the output voltage to the predetermined upper limit and a predetermined lower limit;
in a loaded state, disabling the DC/DC converter when the detected output voltage is greater than the predetermined upper limit or less than the predetermined lower limit; and
upon determining an unloaded state, disabling the DC/DC converter.

19. The method of claim 17, further comprising the steps of:
identifying a predetermined reset condition being met, and
upon identifying the predetermined reset condition as having been met, resetting the accumulated lighting time to zero.

20. The method of claim 19, further comprising the steps of:
identifying when the accumulated lighting time has exceeded a predetermined reset disabling time subsequent to the predetermined switching time, wherein the control circuit does not reset the accumulated lighting time even upon the reset condition being met.

* * * * *